United States Patent
Pietraski et al.

(10) Patent No.: US 9,781,738 B2
(45) Date of Patent: Oct. 3, 2017

(54) PHYSICAL LAYER (PHY) DESIGN FOR A LOW LATENCY MILLIMETER WAVE (MMW) BACKHAUL SYSTEM

(71) Applicant: IDAC HOLDINGS, INC., Wilmington, DE (US)

(72) Inventors: Philip J. Pietraski, Jericho, NY (US); Tao Deng, Roslyn, NY (US); Onur Sahin, Brooklyn, NY (US); Ravikumar V. Pragada, Collegeville, PA (US)

(73) Assignee: IDAC Holdings, Inc., Wilmington, DE (US)

( * ) Notice: Subject to any disclaimer, the term of this patent is extended or adjusted under 35 U.S.C. 154(b) by 206 days.

(21) Appl. No.: 14/766,696

(22) PCT Filed: Feb. 6, 2014

(86) PCT No.: PCT/US2014/015141
§ 371 (c)(1),
(2) Date: Aug. 7, 2015

(87) PCT Pub. No.: WO2014/124164
PCT Pub. Date: Aug. 14, 2014

(65) Prior Publication Data
US 2016/0007371 A1     Jan. 7, 2016

Related U.S. Application Data

(60) Provisional application No. 61/762,181, filed on Feb. 7, 2013.

(51) Int. Cl.
*H04W 72/12* (2009.01)
*H04W 72/04* (2009.01)
(Continued)

(52) U.S. Cl.
CPC ........ *H04W 72/1263* (2013.01); *H04B 7/155* (2013.01); *H04L 5/0053* (2013.01);
(Continued)

(58) Field of Classification Search
CPC .............................. H04W 84/18; H04W 84/12
See application file for complete search history.

(56) References Cited

U.S. PATENT DOCUMENTS 8,520,559 B2  8/2013  Rao et al.
8,964,628 B2  2/2015  Kwon et al.
(Continued)

FOREIGN PATENT DOCUMENTS

JP   2013-005322 A2   1/2013
WO   2010/053348      5/2010
(Continued)

OTHER PUBLICATIONS

Khan et al., "mmWave mobile broadband (MMB): Unleashing the 3-300GHz spectrum," 34th IEEE Sarnoff Symposium, pp. 1-6 (May 3-4, 2011).
(Continued)

*Primary Examiner* — Andrew Lai
*Assistant Examiner* — Zhiren Qin
(74) *Attorney, Agent, or Firm* — Volpe & Koenig, P.C.

(57) ABSTRACT

A method and apparatus are disclosed for establishing a low latency millimeter wave (mmW) backhaul connection. A base station may receive a mmW relay schedule from an evolved Node B (eNB) within one Long Term Evolution (LTE) scheduling interval. The base station may decode the mmW relay schedule, and initialize a mmW radio transmission resource according to the mmW relay schedule. The base station may receive a data packet from a second base station in a mmW transmission time interval (TTI) based on the mmW relay schedule using the initialized mmW radio
(Continued)

transmission resource, and may transmit the data packet to a third base station based on the mmW relay schedule using the initialized mmW radio transmission resource. The transmitting may begin before the reception of the data packet is complete.

20 Claims, 13 Drawing Sheets

(51) Int. Cl.
*H04B 7/155* (2006.01)
*H04L 5/00* (2006.01)
*H04W 88/08* (2009.01)

(52) U.S. Cl.
CPC ..... *H04W 72/046* (2013.01); *H04W 72/0426* (2013.01); *H04W 72/1289* (2013.01); *H04L 5/0044* (2013.01); *H04L 5/0091* (2013.01); *H04W 88/08* (2013.01)

(56) References Cited

U.S. PATENT DOCUMENTS

| | | | |
|---|---|---|---|
| 9,037,076 B2 | 5/2015 | Nagata et al. | |
| 9,107,221 B2 | 8/2015 | Cordeiro et al. | |
| 9,237,525 B2* | 1/2016 | Chu | H04W 52/0216 |
| 2009/0245165 A1 | 10/2009 | Li | |
| 2010/0053348 A1 | 3/2010 | Yoshimoto et al. | |
| 2011/0038783 A1 | 2/2011 | Satchell, Jr. et al. | |
| 2011/0051685 A1* | 3/2011 | Saitou | H04W 36/02 |
| | | | 370/331 |
| 2012/0002103 A1* | 1/2012 | Shao | H04N 21/43637 |
| | | | 348/388.1 |
| 2012/0105881 A1 | 5/2012 | Fukaya | |
| 2012/0238202 A1* | 9/2012 | Kim | H04W 72/1231 |
| | | | 455/7 |
| 2013/0279467 A1* | 10/2013 | Trainin | H04W 72/0446 |
| | | | 370/330 |
| 2013/0286960 A1 | 10/2013 | Li et al. | |

FOREIGN PATENT DOCUMENTS

| | | |
|---|---|---|
| WO | 2011000090 A1 | 1/2011 |
| WO | 2011/038783 | 4/2011 |
| WO | 2012/105881 | 8/2012 |

OTHER PUBLICATIONS

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Oct. 2012).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.8.0 (Dec. 2012).

Third Generation Partnership Project, "Technical Specification Group Radio Access Network; Evolved Universal Terrestrial Radio Access (E-UTRA); Physical layer procedures (Release 10)," 3GPP TS 36.213 V10.11.0 (Dec. 2013).

Third Generation Partnership Project, "Technical Specification Group Radio Access Network; Evolved Universal Terrestrial Radio Access (E-UTRA); Physical layer procedures (Release 11)," 3GPP TS 36.213 V11.1.0 (Dec. 2012).

Third Generation Partnership Project, "Technical Specification Group Radio Access Network; Evolved Universal Terrestrial Radio Access (E-UTRA); Physical layer procedures (Release 11)," 3GPP TS 36.213 V11.5.0 (Dec. 2013).

Third Generation Partnership Project, "Technical Specification Group Radio Access Network; Evolved Universal Terrestrial Radio Access (E-UTRA); Physical layer procedures (Release 10)," 3GPP TS 36.213 V12.0.0 (Dec. 2013).

* cited by examiner

PHYSICAL LAYER (PHY) DESIGN FOR A LOW LATENCY MILLIMETER WAVE (MMW) BACKHAUL SYSTEM

CROSS REFERENCE TO RELATED APPLICATIONS

This application claims the benefit of U.S. provisional application No. 61/762,181 filed Feb. 7, 2013, the contents of which is hereby incorporated by reference herein.

BACKGROUND

The third generation partnership program (3GPP) introduced long term evolution (LTE) to increase cellular network bandwidth for anticipated mobile data demand. However, it is projected that the mobile data demand growth will soon outpace the capacity introduced by even the next generation of LTE, the LTE-Advanced (LTE-A).

SUMMARY

A method and apparatus are disclosed for establishing a low latency millimeter wave (mmW) backhaul connection. A base station may receive a mmW relay schedule from an evolved Node B (eNB) within one Long Term Evolution (LTE) scheduling interval. The base station may decode the mmW relay schedule, and initialize a mmW radio transmission resource according to the mmW relay schedule. The base station may receive a data packet from a second base station in a mmW transmission time interval (TTI) based on the mmW relay schedule using the initialized mmW radio transmission resource, and may transmit the data packet to a third base station based on the mmW relay schedule using the initialized mmW radio transmission resource. The transmitting may begin before the reception of the data packet is complete.

BRIEF DESCRIPTION OF THE DRAWINGS

A more detailed understanding may be had from the following description, given by way of example in conjunction with the accompanying drawings wherein.

DETAILED DESCRIPTION

Figure 1A:
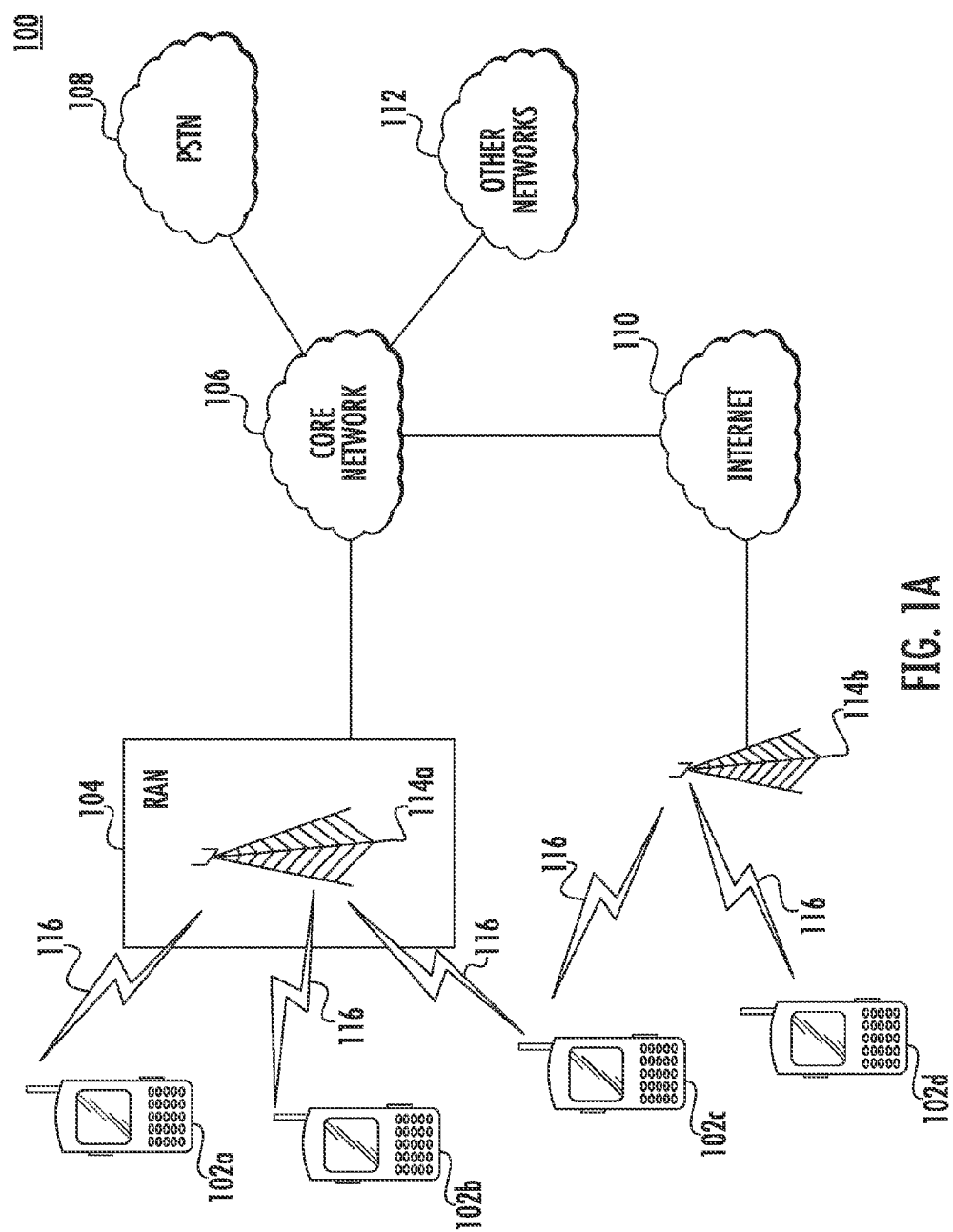
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
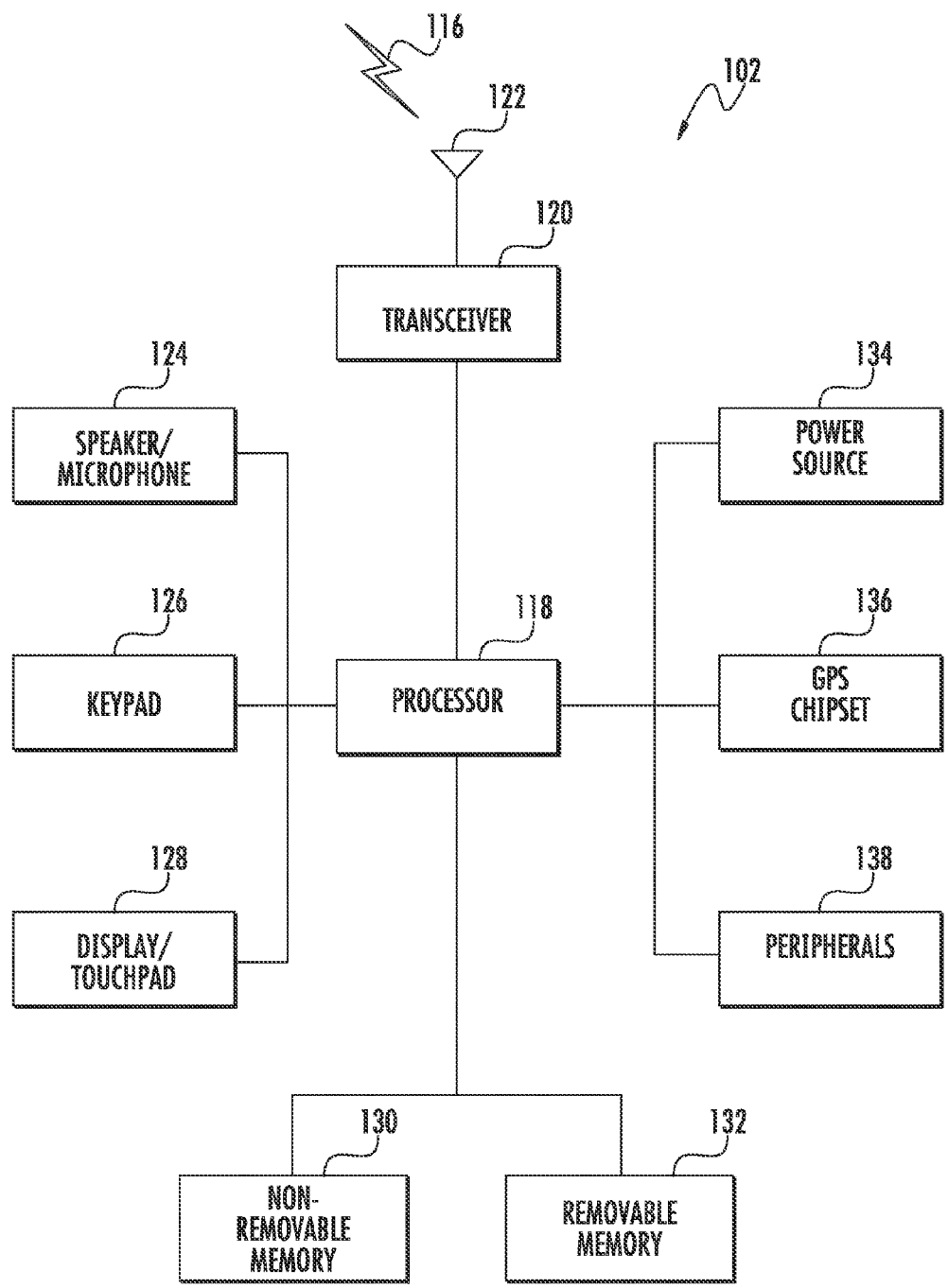
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/ receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
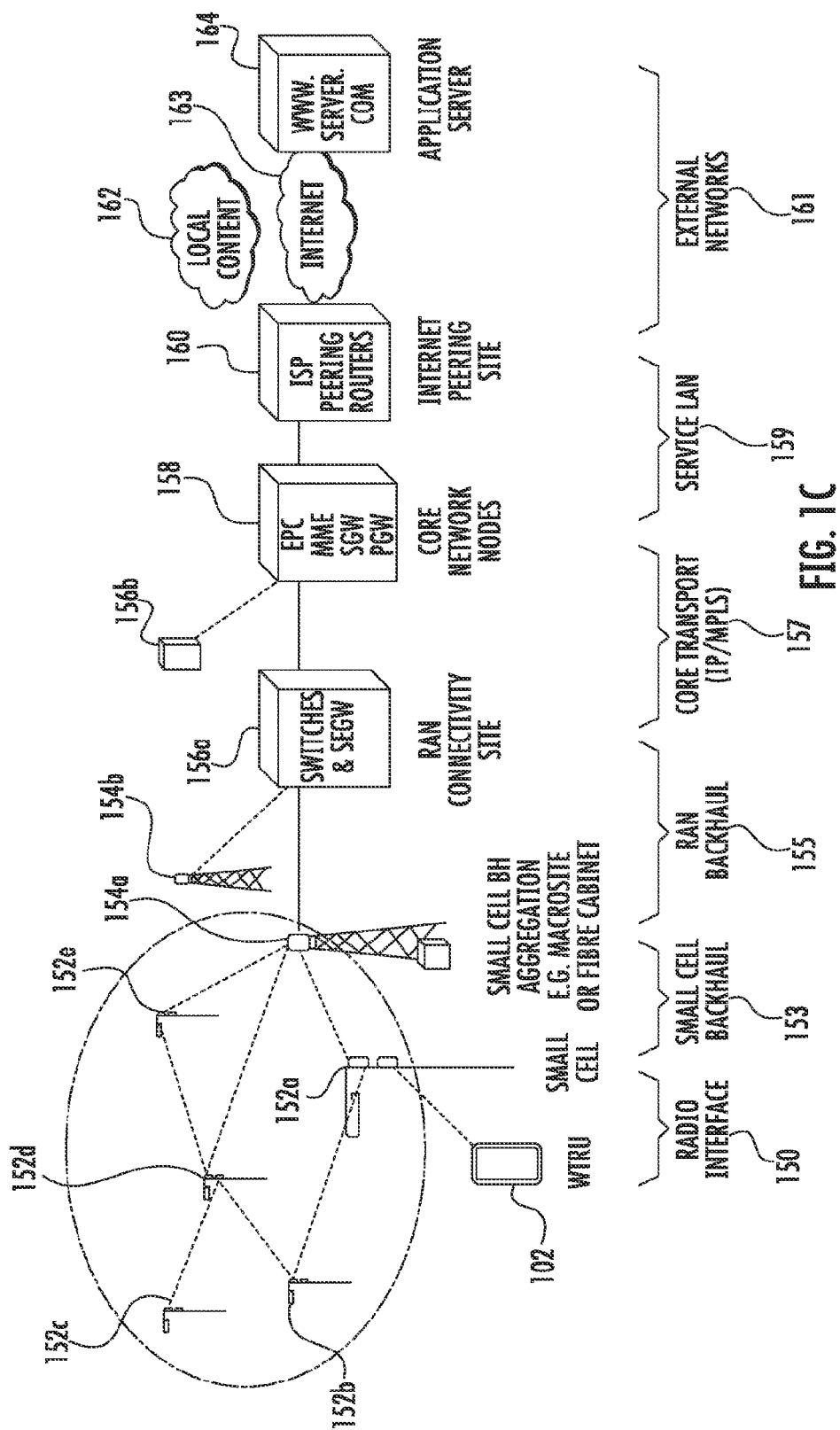
FIG. 1C is a system diagram of a small cell backhaul in an end-to-end mobile network infrastructure.

FIG. 1C is a system diagram of a small cell backhaul in an end-to-end mobile network infrastructure according to an embodiment. A set of small cell (SC) nodes 152a, 152b, 152c, 152d, and 152e and aggregation points 154a and 154b interconnected via directional millimeter wave (mmW) wireless links may comprise a "directional-mesh" network and provide backhaul connectivity. For example, the WTRU 102 may connect via the radio interface 150 to the small cell backhaul 153 via small cell 152a and aggregation point 154a. In this example, the aggregation point 154a provides the WTRU 102 access via the RAN backhaul 155 to a RAN connectivity site 156a. The WTRU 102 therefore then has access to the core network nodes 158 via the core transport 157 and to internet service provider (ISP) 160 via the service LAN 159. The WTRU also has access to external networks 161 including but not limited to local content 162, the Internet 163, and application server 164. It should be noted that for purposes of example, the number of SC nodes 152 is five; however, any number of nodes 152 may be included in the set of SC nodes.

Figure 1D:
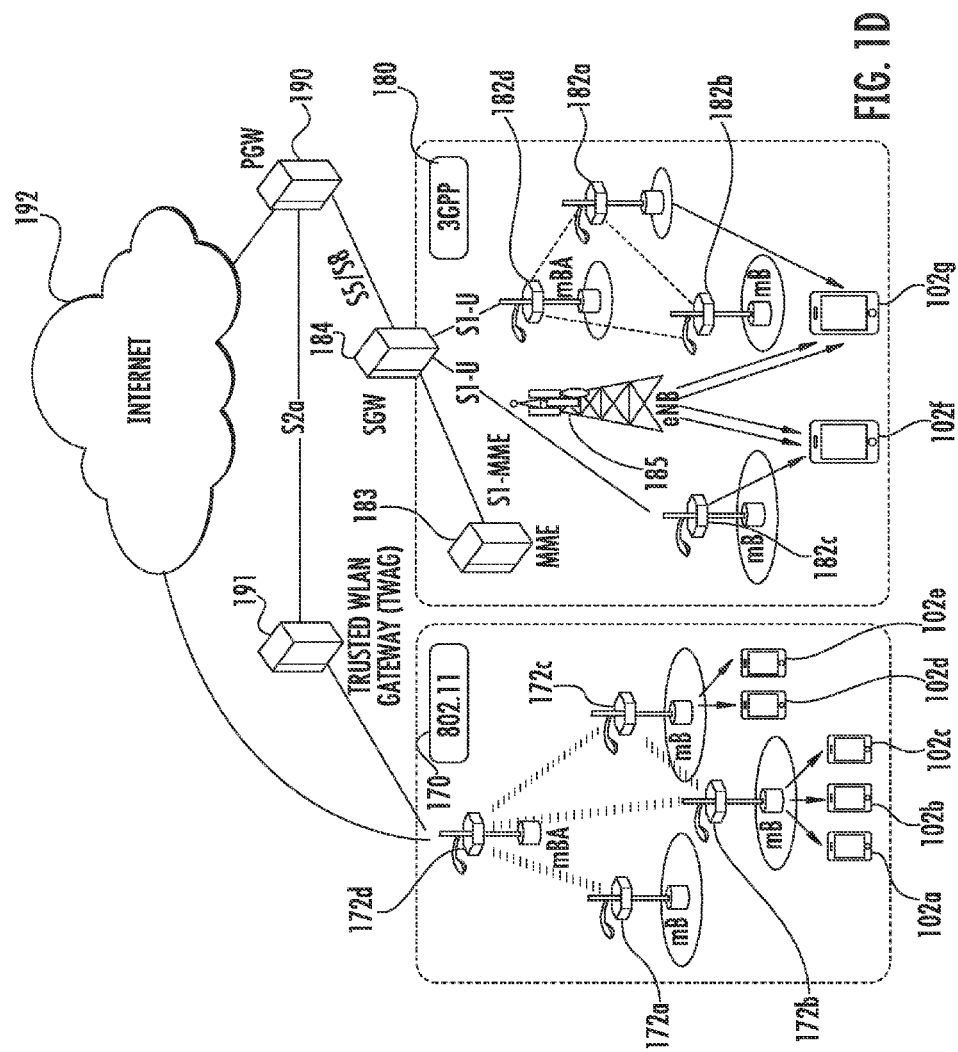
FIG. 1D is a system diagram of a mmW backhaul applied to both a 3GPP cellular network and a non-3GPP network access infrastructure.

FIG. 1D is a system diagram of a mmW backhaul applied to both a 3GPP cellular network and a non-3GPP network access infrastructure according to an embodiment. In this example, the non-3GPP network is IEEE 802.11 based. The WTRUs 102a, 102b, 102c, 102d, and 102e may have access via millimeter wave base stations (mBs) 172a, 172b, and 172c in an 802.11 network 170 to a millimeter wave base station aggregator (mBA) 172d. The mBA 172d may provide access to external networks such as the Internet 192, and to the cellular network via a trusted WLAN gateway (TWAG) 191.

Also, in this example, WTRU 102f in the 3GPP network 180 may have access via mBs 182a and 182c to a mobility management entity (MME) 183 and a serving gateway (SGW) 184, which may provide access to public data network gateway (PGW) 190 and the Internet 192.

WTRUs 102f and 102g may also have access via mBs 182a and 182b via mBA 182d to SGW 184, which may provide access to public data network gateway (PGW) 190 and the Internet 192.

WTRUs 102f and 102g may also have access via an evolved Node B (eNB) 185 to the MME 183 and SGW 184, which may provide access to the public data network gateway (PGW) 190 and the Internet 192.

As shown in the examples of FIG. 1C and FIG. 1D, wireless mesh networks (WMNs) operating at mmW frequencies may be used, for example, to serve as backhaul networks for cellular or WLAN SCs such as those based on, for example, LTE or IEEE 802.11. An mmW directional mesh network may be an economical solution to provide backhaul connectivity to several cheaply deployed SCs. Directional links using highly directional antennas may be used to close the link budget at mmW frequencies. A directional mesh network may also provide a flexible topology by requiring Line-Of-Sight (LOS) with only immediate neighbors. A directional mesh network may provide easy scalability in that new nodes may be added with minimal network planning. A directional mesh network may provide robustness in redundancy provided by multiple connectivity paths between mesh-nodes. A directional-mesh network may be configured with fully distributed scheduled, multi-hop, and time division multiple access (TDMA) based directional mesh MAC features to ensure fast scheduling and short queue times.

Figure 2:
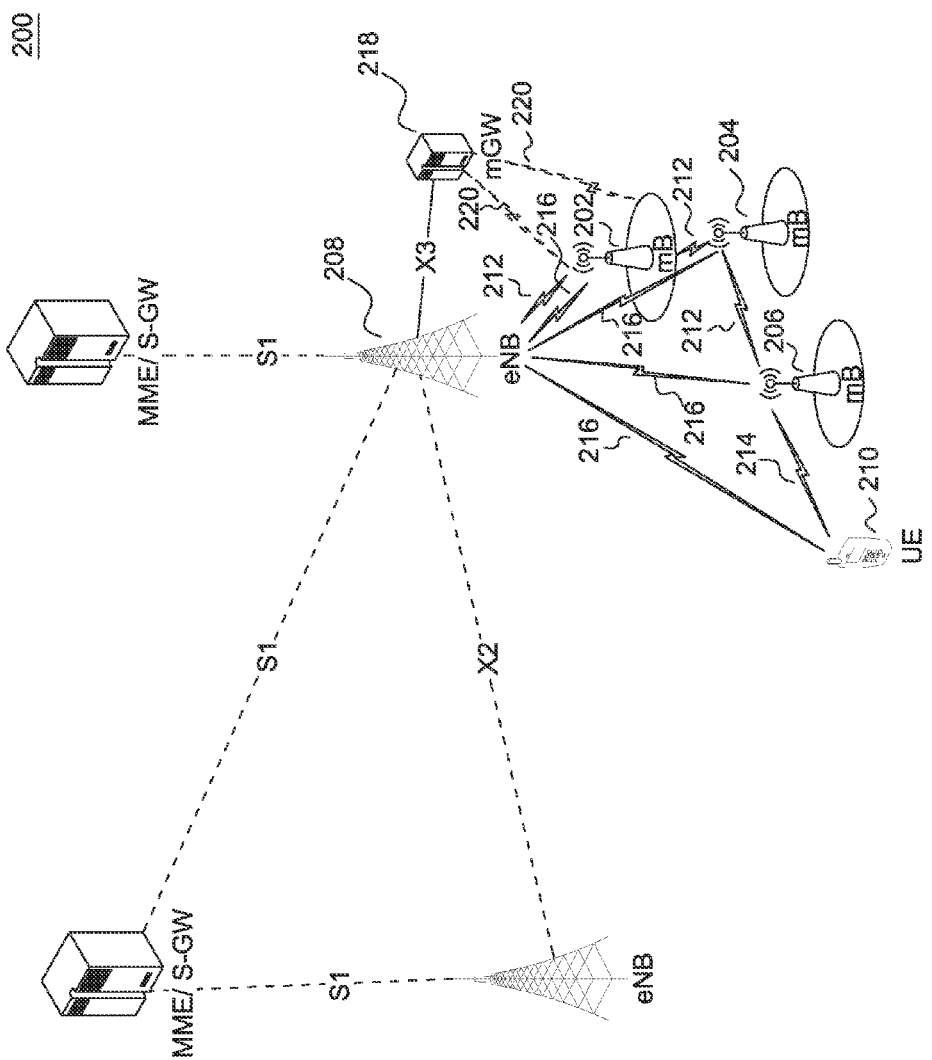
FIG. 2 illustrates a low latency mmW system overview.

The millimeter wave (mmW) hot-spot underlay and backhaul system deploys a mmW mesh network with an overlay traditional cellular system. The resulting hybrid wireless system consists of a cellular layer and an mmW layer. Referring to FIG. 2, the mmW mesh network 200 may consist of mmW base stations (mBs) 202, 204, 206 that may bidirectionally relay transmissions on the mmW layer between a source eNB 208 and a target UE 210 via a scheduled route over a number of peer mBs.

The scheduling of the mmW backhaul links 212 and the mmW UE access link 214 may be centralized at the eNB 208, and may be communicated via cellular signaling 216. Alternatively, a mmW gateway (mGW) 218 may be responsible for routing and higher layer access stratum (AS) processing of user data that is carried on the mmW layer, and may communicate with the mBs 202, 204, 206 via the mmW layer 220, as indicated in FIG. 2.

The edge mB 206, i.e., the mB directly communicating with the target UE 210, may serve as a hot spot base station covering a local group of UEs to increase the system capacity and alleviate the cellular system load. The hot spot base station may have several different modes of operation.

The envisioned relaying may apply amplify and forward (AF) technology (including full duplex and small/zero duplex distances), and the resulting latency through the mesh network may be considered small enough to be negligible in view of the overall latency budget in the end-to-end transmission, which may be analogous to fiber transmission latencies. In addition, the backhaul links may remain relatively static over the course of the mmW data transmission. Thus the AF-based low latency mmW system may be also referred as a fiber parity system.

Alternatively, the edge mB 206 may employ decode and forward (DF) technology and retransmit the packet at a lower modulation and/or code rate to the target UE 210. This is seen as useful since the mmW access link quality may be lower than the quality of the backhaul (BH) links since the UE is more likely to have physically worse channel conditions, and because UE antennas are likely to have lower capabilities than BH antennas. With small enough slot sizes, the one additional DF process may add only a small additional end-to-end delay, and only in the access link. The eNB may still have complete scheduling control of the mmW resources in the access link. In this case the system may become a backhaul-only mmW system, consisting of the mB nodes with mmW backhaul links.

The mBs and UEs of a mmW hot spot system may be covered by and associated with a cellular network and may potentially operate on both cellular and mmW layers. The coordination, scheduling, and routing of the system may be performed by a centralized entity, e.g., an entity residing in the eNB and signaled to all other nodes on the cellular layer. Thus the higher layer and physical layer control signaling may be exclusively communicated via the cellular layer signaling between all nodes and the mmW layer signaling may carry traffic data only. Accordingly, the mmW layer scheduling may be performed and conveyed by the cellular layer, i.e., cross layer scheduling. In the case of the backhaul-only low latency mmW system, some control and coordination information may be exchanged over the X2 interface between small cells.

Figure 3:
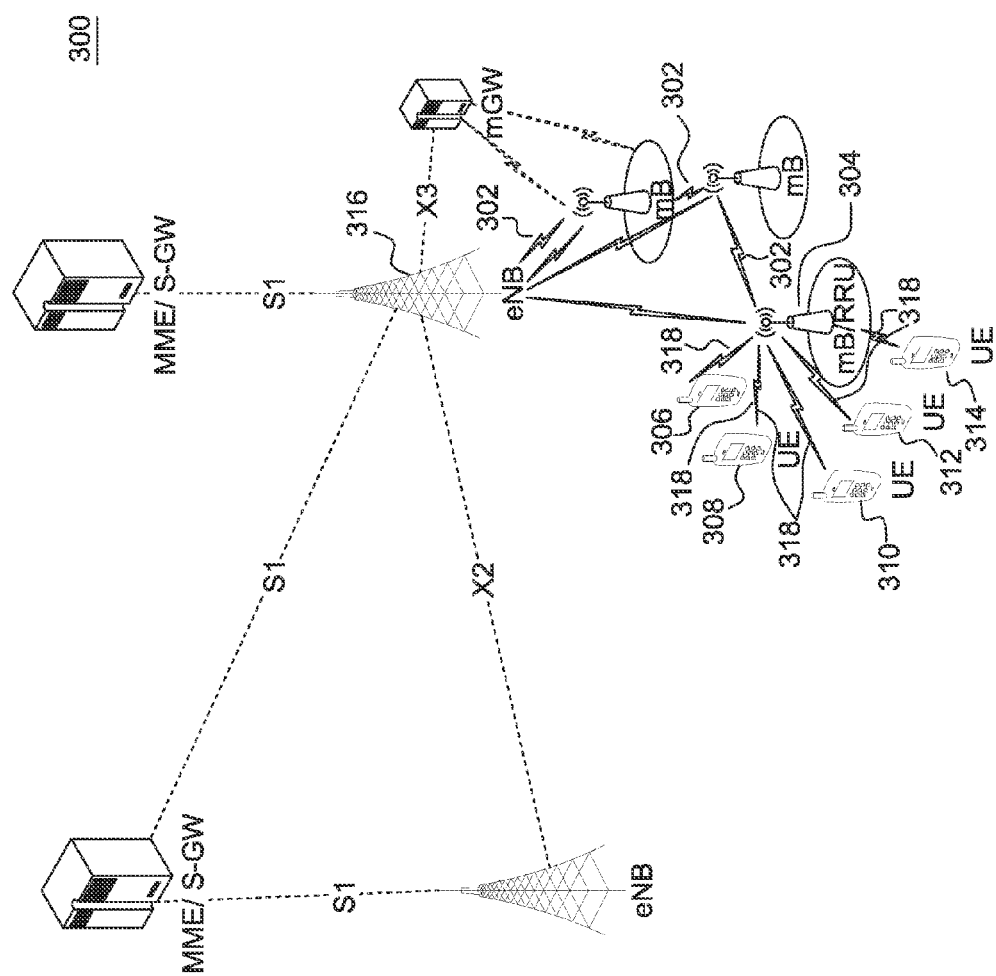
FIG. 3 shows an exemplary low latency mmW backhaul system.

Referring to FIG. 3, the low latency mmW system may provide backhaul transmissions 302 to an edge mB 304 that may be, for example, a remote radio unit (RRU). The AF mmW data may thus carry multi-user data traffic for some or all of the UEs 306-314 that are associated with the edge mB/RRU 304. This may be equivalent to the current RRU solution, but with the fiber between the edge mB/RRU 304 and the eNB 316 being replaced by the low latency mmW system. The data multiplexing over the fiber may be realized over the AF link, because the mmW bandwidth may be much larger than the cellular access link bandwidth, e.g., in an LTE system. In this option, the access links 318 between the edge mB/RRU 304 and the UEs 306-314 may be either mmW or cellular, and the UEs 306-314 associated with the edge mB/RRU 304 may not have cellular links to the eNB 316.

A brief summary of the low latency mmW system nodes is now provided.

An eNB is a traditional cellular node performing the centralized control, scheduling, and routing of the mmW hot-spot underlay system. An eNB may communicate with neighbor mBs via mmW links. An mB is a mmW base station that may communicate with its neighbor mBs via mmW links and may register at the eNB via a cellular link as an advanced user device with enhanced capabilities associated with the underlay system, for example certain reduced eNB functionalities. A mB may apply AF via mmW backhaul links to relay a transmission to another mB according to a route scheduled by the eNB. A mB may communicate with multiple UEs and mUEs and may serve as a hot spot base station via mmW access links. A mUE is a traditional cellular node with mmW capability that may communicate with its associated eNB via a cellular access link and with a mB via a mmW access link.

The overlay system may be a cellular system such as a R10 LTE network or another network based on WiFi or WiMAX systems. The overlay system may also operate in a different spectrum space such as TV white space (TVWS). The mmW BH link and mmW access link may be based on the IEEE 802.11ad network, the new 60 GHz band system discussed in the subsequent paragraphs, or on another system in a different frequency band.

Figure 4:
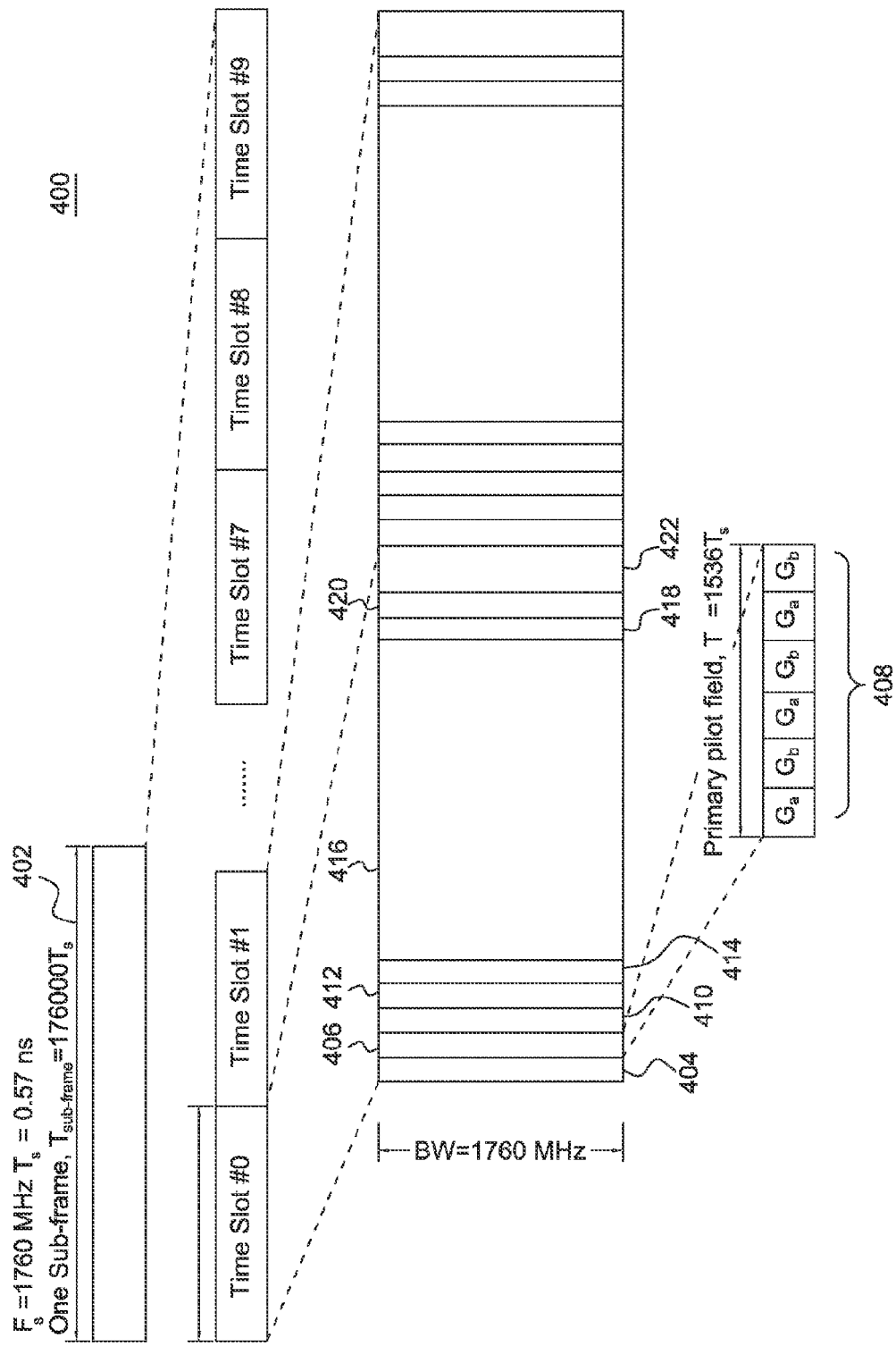
FIG. 4 is an example mmW access link frame structure.

An example of a single-carrier mmW access link frame structure is shown in FIG. 4. One transmission time interval (TTI) in this example is one time slot of 100-μs length. In order to facilitate the cross layer scheduling, the frame structure 400 has a 1-ms sub-frame 402 that aligns with the LTE sub-frame structure. The number of TTIs per mmW access link sub-frame may be tied to the number of scheduling instances in the cellular link, and accordingly the length of the frame structure may depend on the cross layer scheduling scheme.

In this example, each mmW access link time slot may be scheduled via a mmW Physical Downlink Control Channel (mmPDCCH) mapped at one symbol location in the LTE sub-frame. Thus, the ten time slots shown in FIG. 4, Time Slot #0-9, may require ten mmPDCCHs transmitted in ten consecutive symbol locations. The mmPDCCH may be multiplexed with the regular Physical Downlink Shared Channel (PDSCH) and with different types of LTE reference signals in the frequency domain at the same symbol location. More details of the scheduling scheme are provided herein.

The mmW access link TTI may be also 1 ms, which is the length of the sub-frame. In this case the scheduling instance required in one LTE sub-frame is reduced to one symbol location. The advantage of a longer TTI is that the mmW scheduling may require fewer LTE resources. Given the large bandwidth that a mmW access link may apply, however, the transport block size may become too large to handle.

The frame structure may apply a sampling frequency of about 1760 MHz, which is about the same as the 802.11ad system, and the resulting base time unit is about 0.57 ns. However, to provide more flexibility in the cross layer scheduling scheme and to enable a common block sharing between the LTE link and the mmW link in one device, the sampling frequency may be a common multiple of the LTE sampling frequency of 30.72 MHz and the cross layer scheduling instances. For example, when the LTE DL has ten mmPDCCHs in one sub-frame, the mmW access link may use a sampling frequency of 30.72×572=1757.184 MHz. It should be noted that the 802.11ad sampling frequency is 1760 MHz. The sampling frequency of 1757.184 MHz can certainly align with 10 mmPDCCH instances in one LTE sub-frame.

Furthermore, in order to accommodate a set of possible scheduling instances in one LTE sub-frame, the number of TTIs per mmW access link sub-frame may be based on the least common multiple of the set and the LTE sampling frequency (15000×2048) and a sampling factor so that the single carrier bandwidth occupies a good part of the available 2 GHz. For example, considering a set of scheduling instances of {8, 9, 10, 11, 12}, the least common multiple of the set is 3960. The least common multiple of 3960 and the LTE sampling frequency of 30720000 is 126720000. Thus a sampling frequency of 1774.08 MHz (K at 14) may be used.

As described above, each OFDM symbol time of the LTE PDSCH may correspond to one mmW end-to-end scheduling event. For illustration, the first 10 PDSCH OFDM symbols may be used for scheduling the mmW layer. Other variations are possible and may adapt to varying numbers of PDSCH symbols. The timing offset from the end of the first BH/mmPDCCH message (i.e., the end of first PDSCH OFDM symbol) to the start of the corresponding mmW slots (To,1) at the PoP node may be signaled to all other nodes via RRC signaling in the cellular layer.

The timing offset from the end of the kth BH/mmPDCCH message to the start of the corresponding mmW slots (To,k) at the PoP node may be larger for increasing k. This is because the first ten OFDM symbols of the PDSCH may be used for the ten BH/mmPDCCH messages corresponding to 1 ms worth of mmW TTIs, i.e., the LTE PDCCH (and possibly some trailing OFDM symbols for the LTE PDSCH if the mmW slots do not adapt to the PDSCH symbols) may not be used for scheduling the mmW layer. The timing offset may be defined by the following equation:

$$To,k = To,1 + (k-1)*(NOFDM - Nmm)/(NOFDM) [ms],$$

where Nmm is equal to the number of PDSCH symbols used for mmW scheduling.

The delay of the mmW time frame may on average be longer than for the LTE signal (due to a longer path and some AF delay). Each AF node may start the AF action relative to its LTE timeframe. A guard period may be added to each mmW packet to allow timing drift of the mmW time frame relative to the LTE time frame. The guard period may be at least as long as the maximum difference between the LTE and mmW timeframes. With Manhattan grid routing, the propagation distance difference should be approximately equal to (sqrt(2)−1)*LOS path, which as a 1 km macro radius is approximately equal to 414 m. This gives a delay of 414 m/3×10$^8$ m/s=1.4 μs. The processing delay per hop may be approximately 100 ns, giving 500 ns total for five hops. This time, combined with the 1.4 μs travel time discussed above, results in about a 2 μs delay. With a 2× safety factor, a 4 μs guard period may be reasonable. The above-described approach for scheduling and synchronization may be applied to other types of mmW channels with different bandwidths or to a different overlay system with a different sampling frequency.

The physical layer information carried in the mmW access link TTI may be categorized as follows. Referring to FIG. 4, the automatic gain control (AGC) field 404 may include the fixed sequence intended for the AGC settling and convergence. The primary pilot field 406 may include the pilot sequence generated by the source eNB for the purpose of timing acquisition and channel estimation. Golay sequences 408 may be considered as shown in FIG. 4. The auxiliary pilot field 410 may include an optional pilot sequence generated by the edge mB, e.g., in DF application for the purpose of timing acquisition and channel estimation of the last hop. The auxiliary control field 412 may include an optional short message from the edge mB pertaining to the last hop. The header 414 may include optional control information required for reception of the data field of the last hop, e.g. MCS, packet ID, etc. The data field 416 may include the traffic data carried in this TTI. The beam refinement field 418 may include optional control information for beam refinement. The QCI reporting field 420 may contain QCI information for backhaul links and access links. The guard period 422 may be a preset period of guard interval to remove timing impact from propagation. The number of the field, the content carried in each field, the order of the fields, and the duration of each field discussed in this section are one example of the mmW frame structure. Different design parameters may be considered.

The cross layer scheduling may be performed by the eNB and transmitted in the downlink control channel on the cellular layer, e.g., the PDCCH in LTE systems. The scheduled transmissions, however, may occur on the mmW layer, either on the mmW access link or the mmW backhaul link. This is the reason that the scheduling is referred to as cross layer scheduling.

The cross layer scheduling differs significantly from the cross carrier scheduling of the LTE R10 system because of the inequality in the length of the TTI of the mmW backhaul/access link and the LTE link. The LTE TTI may correspond to multiple mmW TTIs, and as a result the LTE sub-frame may need to have an equal number of scheduling instances as mmW TTIs of one mmW sub-frame. As discussed above in connection with the frame structure, the cellular layer may schedule mmW transmissions as often in one sub-frame as the number of TTIs of one mmW sub-frame.

The LTE R11 standard introduced the Enhanced Physical Downlink Control Channel (EPDCCH) as specified in TS 36.213. The EPDCCH is only used for the UE-specific search area and is multiplexed with the PDSCH and DL reference signals at the same symbol locations beyond those signaled in the Physical Control Format Indicator Channel (PFICH). The starting position is configured by the higher layer parameter of epdcch-StartSymbol in the RRC dedicated signaling, and a UE may monitor the EPDCCH at each symbol location from the starting position until the last position of the sub-frame. A UE may also receive an EPDCCH Physical Resource Block (PRB) configuration including a PRB set, the number of PRB pairs, etc., via the dedicated RRC signaling. The UE may perform EPDCCH candidate monitoring, i.e., blind detection in a similar manner as it does for the regular PDCCH according to the pre-defined set of aggregation levels. The EDPCCH carries a pre-defined set of DCI formats.

At a high level, the cross layer scheduling schemes may include the following. The PDCCH may carry new DCIs, e.g., a mmDCI for the access link and a BHDCI for the backhaul link, that do not carry mmW data channel resource allocation and scheduling information, but that do carry information related to a mmW control channel. The information may point to the location and configuration of the mmPDCCH or BHPDCCH. Thus, blind detection may not be applied on the mmPDCCH or BHPDCCH.

In another possible scheme, RRC dedicated signaling may convey the resource location and configuration of the mmP-DCCH or BHPDCCH. Blind detection may be applied on the mmPDCCH or BHPDCCH in a mechanism similar to the EPDCCH. However, one EPDCCH may be distributed over a span of symbols and may not be decoded completely until the end of the LTE sub-frame. The mmPDCCH or BHPDCCH, on the contrary, may need to be decoded completely at each symbol location.

In a third possible scheme, RRC dedicated signaling may convey the resource location and configuration of the mmP-DCCH or BHPDCCH, and no blind detection may be applied. The PDCCH may carry a new DCI to trigger the decoding of the mmPDCCH or BHPDCCH. Note that this DCI, unlike the DCI in the first scheme described above, may not carry any scheduling or grant information for the mmW control channel. A combination of the above-described schemes may also be used.

Figure 5:
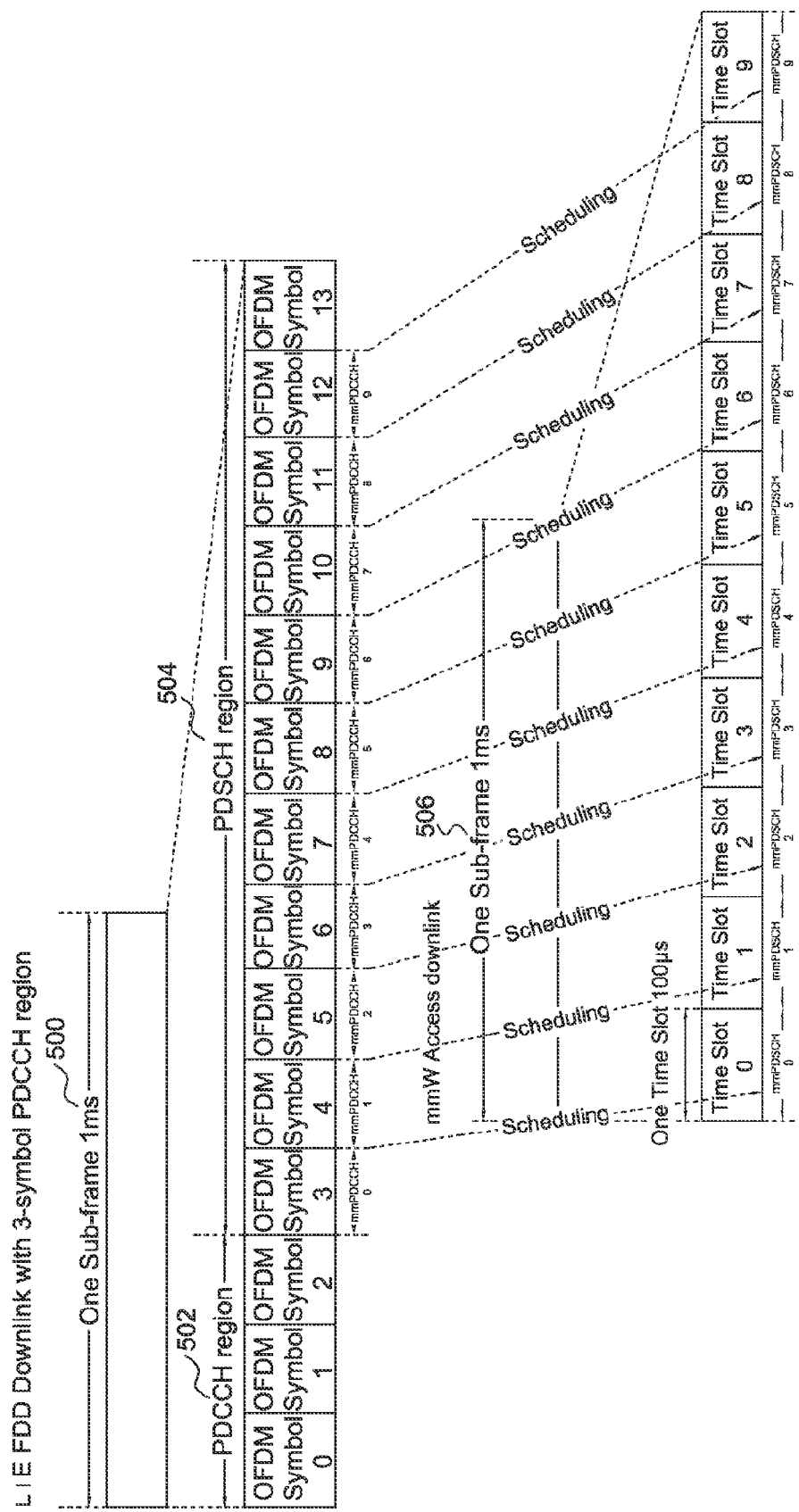
FIG. 5 shows an example of the scheduling of the mmW data channel.

An example of the first scheduling scheme is depicted in FIG. 5. An FDD downlink sub-frame 500 has a duration of 1 ms, and includes a PDCCH region 502 and a PDSCH region 504. In the example shown in FIG. 5, the PDCCH region 502 includes three OFDM symbols, OFDM Symbols 0-2. The PDSCH region 504 includes eleven OFDM symbols, OFDM Symbols 3-13, though other numbers of symbols for the PDCCH and PDSCH regions may be used. The PDCCH may carry new DCIs, for example a mmDCI for access link scheduling. The mmDCI may carry information pointing to the location and configuration of the mmPDCCH. As shown in FIG. 5, the mmPDCCH, which may be multiplexed with the PDSCH, may carry scheduling information for the mmPDSCH. The mmW access downlink sub-frame 506 may have a 1 ms duration divided into ten time slots, each time slot having a 100 µs duration. Ten LTE OFDM symbols in the PDSCH region may carry scheduling information for the ten mmPDSCH time slots.

Figure 6:
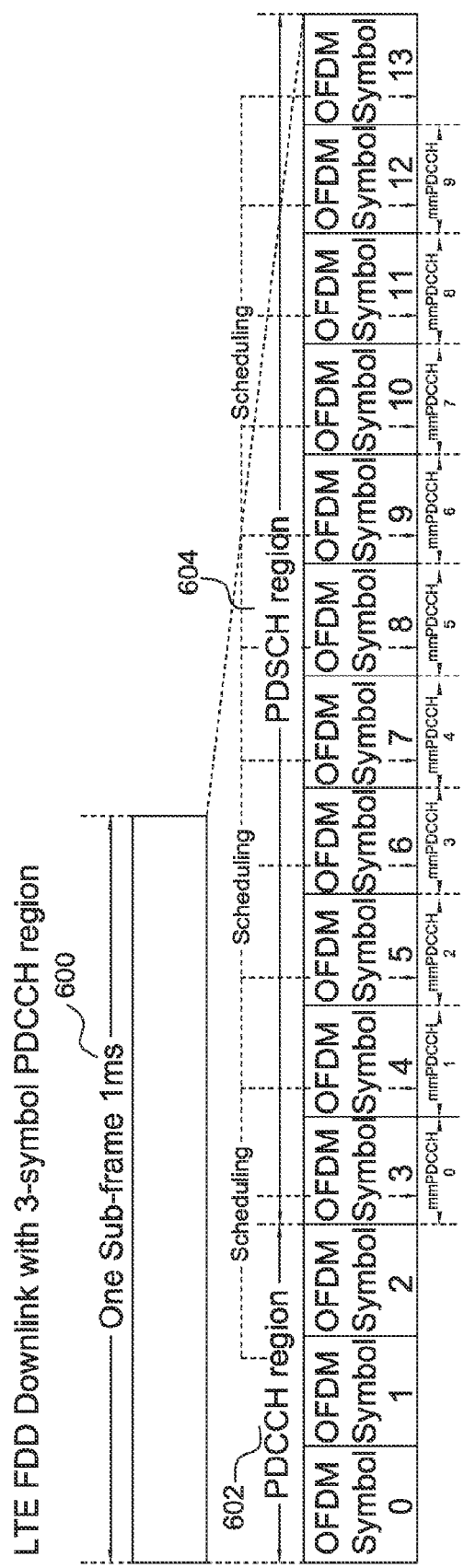
FIG. 6 shows an example of the scheduling of the mmW Physical Downlink Control Channel (mmPDCCH)

The inventive LTE DCIs are discussed in detail in the subsequent sections. As indicated by the dashed lines in FIG. 6, an LTE DCI for the mmW access link (mmDCI) may be added to the PDCCH region 602 of an LTE sub-frame 600 to indicate a region of the PDSCH 604 (which may be multiplexed with the mmPDCCH). The indicated region, OFDM Symbols 3-12 in FIG. 6, may be used for the scheduling of the multiple mmW TTIs in that interval for the UE on the mmW access link.

As a mUE is associated with the network, it may use the designated Radio Network Temporary Identifier (RNTI) in the PDCCH decoding to detect the PDCCH DCI intended for it. The mmDCI may include the symbol location, the PRB allocation, the sub-frame number, etc., that a mUE may need to decode the mmPDCCH. The mmDCI may also include a frequency allocation of the mmPDCCH, and a transport format of the mmPDCCH.

Alternatively or additionally, the mmPDCCH monitoring configuration, e.g., the symbol location, the region of PRB, etc., may be signaled in RRC dedicated signaling so that the mUE may know where to monitor the mmPDCCH beforehand. The monitoring of the mmPDCCH, however, may be commanded by the mmDCI.

In the case in which the edge mB is a type of remote radio unit (RRU) and the mmW AF operation carries data for multiple users associated with the RRU, the mmDCI may be intended for a group including not only the mBs involved in the AF route but all of the mUEs whose data are multiplexed in the relayed transmission. The mmDCI may therefore provide further information as to how the user data is multiplexed in the transmission, e.g., the frequency resource allocation of each user, in order for each user to identify its data.

A mB/mUE may monitor the channel and receive a control message such as mmW access link scheduling information including grant and scheduling of the mmW access downlink/uplink transmissions. The mB/mUE may learn the location of the mmPDCCH within the PDSCH region via a PDCCH DCI and may decode its complete mmW control message per LTE OFDM symbol.

The mmPDCCH may have the following fields with information required for a mUE to receive on an access link from an mB: an Uplink/Downlink field (1 bit); a Full mBID field (7 bits); a UEID_mBID field that includes the index of the mUE associated with that particular mB (7 bits); an MCS field (5 bits); a Channel field (2 bits); and an UL Tx power field (this may be a 1-bit field indicating an increase/decrease relative to the last received Tx power field, or a 5-bit field to accommodate an absolute value of a power level with a maximum higher than 20 dBm). In the case of ⅓ rate convolutional coding, roughly five PRBs may be required for this content. This information may be appended by a number of cyclic redundancy check (CRC) bits for protection.

Alternatively, the mmPDCCH may carry the fields below for a total of about 30-32 bits with eight CRC bits: an Uplink/Downlink field (1 bit); a mmW UEID in macro cell field that includes maximum number of UEs in mmW sessions per PoP (8-10 bits); and eNB ID of edge mB field that includes a maximum of 128 mBs per PoP (7 bits); an MCS field (4 bits); a Channel field (2 bits); and a CRC field (8-16 bits).

The mmPDCCH may be semi-statically scheduled or dynamically scheduled by the mmDCI in the PDCCH or via dedicated RRC signaling. The mmPDCCH may be mapped to a contiguous set of PRBs or be distributed over the PDSCH region (e.g., for frequency diversity). Therefore the network may stagger the mmPDCCH with the PDSCH and with downlink reference signals in the frequency domain on a symbol location. The number of mmPDCCHs one symbol location can accommodate may thus be variable depending on the mmPDCCH payload, system bandwidth, reference signal configuration, cell load, etc.

Figure 7:
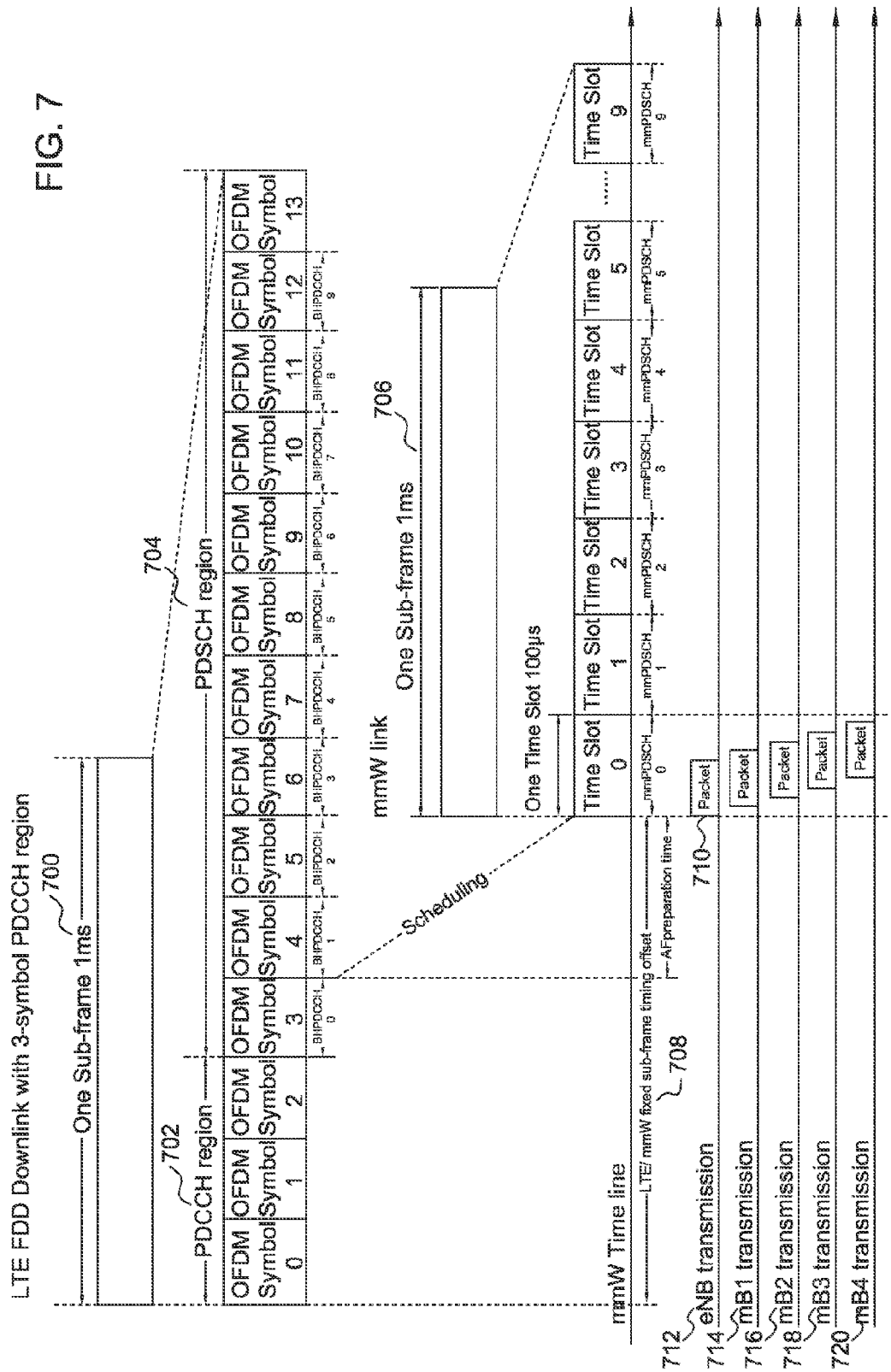
FIG. 7 shows a synchronized amplify-and-relay operation.

FIG. 7 illustrates mmW transmit/receive scheduling for mBs. One LTE sub-frame 700 includes a PDCCH region 702 and a PDSCH region 704. The PDSCH region may include scheduling information for mmPDSCH time slots in a mmW sub-frame 706. As shown in FIG. 7, there may be a fixed time offset 708 between the control message and when the mmW transmission/reception occurs, i.e., the type and time location of the control message may uniquely define the corresponding mmW TTI. The offset for allocations (mmW DL) may be different than the offset for grants (mmW UL), e.g., the offset for grants may be longer than for allocations so that the mUE has time to prepare the mmW UL packet. The mmPDCCH may also carry timing information (such as a timing bitmap) for mmW transmission which may include smaller resolution allocations (mmW slots) compared with the mmW TTI (e.g. 100 µs). The timing bitmap may schedule multiple mmW slots in various times.

The cellular layer may also perform the scheduling and routing on the mmW layer for the AF operation over the backhaul to/from the PoP node from/to an edge mB. A new LTE DCI for the backhaul (BHDCI) may be added to indicate a region of the PDSCH (BHPDCCH) that is used to perform scheduling for the multiple mmW TTIs in that interval for the BH. The BHDCI may indicate a frequency allocation of the BHPDCCH and a transport format of the BHPDCCH. Alternatively, the BHDCI may be merged with the mmDCI and may share one type of LTE PDCCH DCI.

The BHDCI may contain the mB_IDs of the mBs that should listen to the corresponding BHPDCCH. The mB_IDs may be explicitly signaled, may be sent as one or more mB group IDs, or may be sent as a combination of mB group IDs and individual mB_IDs. There may be multiple BHDCIs that indicate multiple different BHPDCCHs that different groups of mBs may be listening to.

A single mB or group group of mBs may receive the AF scheduling information from an eNB in an LTE scheduling interval. The group of mBs may receive the information in their BHPDCCHs simultaneously, and may expect the AF packet transmission to occur in the subsequent same mmW TTI. The latency between the scheduling instance and the packet transmission may be compensated by a pre-defined LTE-mmW timing offset 708, as shown in FIG. 7. Moreover, the difference between the mB's LTE reference timing, the propagation delay between mBs, and the RF chain processing delay (on the order of ns) may be dimensioned into the Guard Period design.

When each mB, either independently or as part of a group, has received its scheduling information, it may initialize a mmW radio transmission resource according to the schedule. This may include preparing for the AF relay by steering its receive (Rx) beam to receive from the last mB node and its transmit (Tx) beam to transmit to the next mB node. The indices of all member mBs of the route may be included in the scheduling information, as the eNB and all mBs may maintain a universal mB neighbor list for a common reference. The scheduling information may also include, for each link, a reception time, a receive antenna pattern, a frequency channel for reception, a transmission time, a transmit antenna pattern, a frequency channel for transmission, and a transmit power. Each mB may also configure its RF processing chain with scheduled parameters, e.g., channel and power. The preparation may ensure that the packet is transmitted from the eNB and received by the last relay node within the same mmW TTI. This is illustrated in FIG. 7, wherein a packet 710 is relayed from an eNB 712 to mB4 720 via three other mBs 714-718 within a single TTI (Time Slot 0). As shown in FIG. 7, each mB may begin transmitting the packet before it has received the entire packet. Very low latency transmissions can thus be achieved by the AF relay scheduling occurring on the cellular layer.

The BHPDCCH is a sequence of control messages that indicate to all mBs that are listening to the BHPDCCH when and how to execute AF actions through the BH network. It may be assumed that all nodes (mBs) know the topology of the network, and hence their neighbor IDs. The BHPDCCH may carry the following information: an mB_ID; a direction of the receive beam, i.e., the ID of the node from which to receive a transmission; the channel of the receive transmission; a direction of the transmit beam, i.e., the ID of the node to which to transmit; a channel on which to transmit; a power with which to transmit; and an indication of whether or not to add a training field to the transmission (this may be used by the next hop receiver for sounding or help with initial timing recovery).

Alternatively, the BHPDCCH may carry the information below assuming that all mBs know the BH topology, and have neighbor lists for the eNB and mBs in the network. Accordingly, the mB's may know neighbor indices that are signaled via RRC in LTE. In this case, the BHPDCCH may carry the following information: an uplink/downlink indication (1 bit), and a number of hops (2-3 bits; if maximum allowed hops is 4 then 2 bits. Alternatively, zero bits may be used and one index value may be reserved to indicate end-of-AF-chain.). The BHPDCCH information may further include an index into the eNB's neighbor list that defines the link of hop1 (2-3 bits). Hop1 is the link between the eNB and the first mB (mB1), and accordingly may be indicated by mB1's index value in the eNB's neighbor list. The BHPDCCH information may further include the hop1 channel (2 bits for the 60 GHz band); an index into the base station neighbor list of mB1 that defines the link for hop2 (2-3 bits); the hop2 channel (2 bits for the 60 GHz band); and fields for hop3, hop4, etc., until the last BH hop (4-5 bits per hop). The BHPDCCH may also carry the following additional information: a UE_ID used by the edge mB (7 bits if the number of supported UEs is less than 128); padding (0 to 16-20 bits, depending on the number of hops); and a CRC (8-16 bits). Other possible fields include a link pilot field and a control field that may be used for link sounding and other control message passing between links (1 bit); a beam refinement field (1 bit); an extension field for the UE that indicates that no mmPDCCH is needed, but implies that BH may be operated below capacity since the MCS will tend to be lower; an MCS field (4 bits); and a channel field (2 bits). Given four or five neighbors, the BHDPCCH payload may be 34 bits or 41 bits, respectively, before encoding.

The BHPDCCH may be semi-statically scheduled or dynamically scheduled by the PDCCH or by RRC signaling. Similar to the mmDPCCH, the BHPDCCH may be mapped to a contiguous set of PRBs or may be distributed over the PDSCH region (e.g., for frequency diversity).

There may be a fixed time offset between the control message and when the mmW AF action takes place (i.e., the type and time location of the control message may uniquely define the corresponding mmW TTI). The offset for the mmW DL AF actions may be different than the offset for the mmW UL AF actions, and may depend on whether a UE or mB is the source of the UL traffic. For example, the offset for UL may be longer than for DL so that the source has time to create the mmW UL packet. A UE may need a different amount of time to create such a packet than an mB.

Alternatively, the BHPDCCH may carry the timing information (e.g. a timing bitmap) for mmW transmissions which may include smaller resolution (mmW slots) compared with mmW TTI (e.g. 100 μs). The timing bitmap may schedule multiple mmW slots in various times.

The BHDCI and mmDCI may be combined into an end-to-end DCI (e2eDCI) to provide end-to-end scheduling in a single e2ePDCCH. The e2ePDCCH may contain the combined information of the BHPDCCH and the mmPDCCH. The mUE part and mB part may be in different fields so that each need not decode parts of the message not needed for delivery of the packet. End-to-end acknowledgment/negative acknowledgement (ACK/NACK) messaging may be achieved by a mmW ACK/NACK signaled on the cellular carrier or piggy backed on the mmW UL. For an ACK/NAK signaled on the cellular carrier (e.g., when no mmW UL exists), the DL terminal nodes receiving mmW packets may send the ACK/NACK on the PUCCH (or optionally the PUSCH in the case that the terminal node is an mUE using the PUSCH for UL). Since multiple mmW transmissions may have been received since the last ACK/NACK, the mmW ACK/NACKs may be bundled, and may be further bundled with cellular ACK/NACKs. If all received mmW packets are positively acknowledged, the bundled ACKs may indicate the number of packets so that the sender may determine if a mmPDCCH message was not detected. For an ACK/NAK signaled on the mmW carrier, if the terminal node has an UL grant scheduled at the same time that an ACK/NACK is required to be sent, the ACK/NACK may be added to the mmW transmission rather than being sent on the PUSCH/PUCCH.

Figure 8:
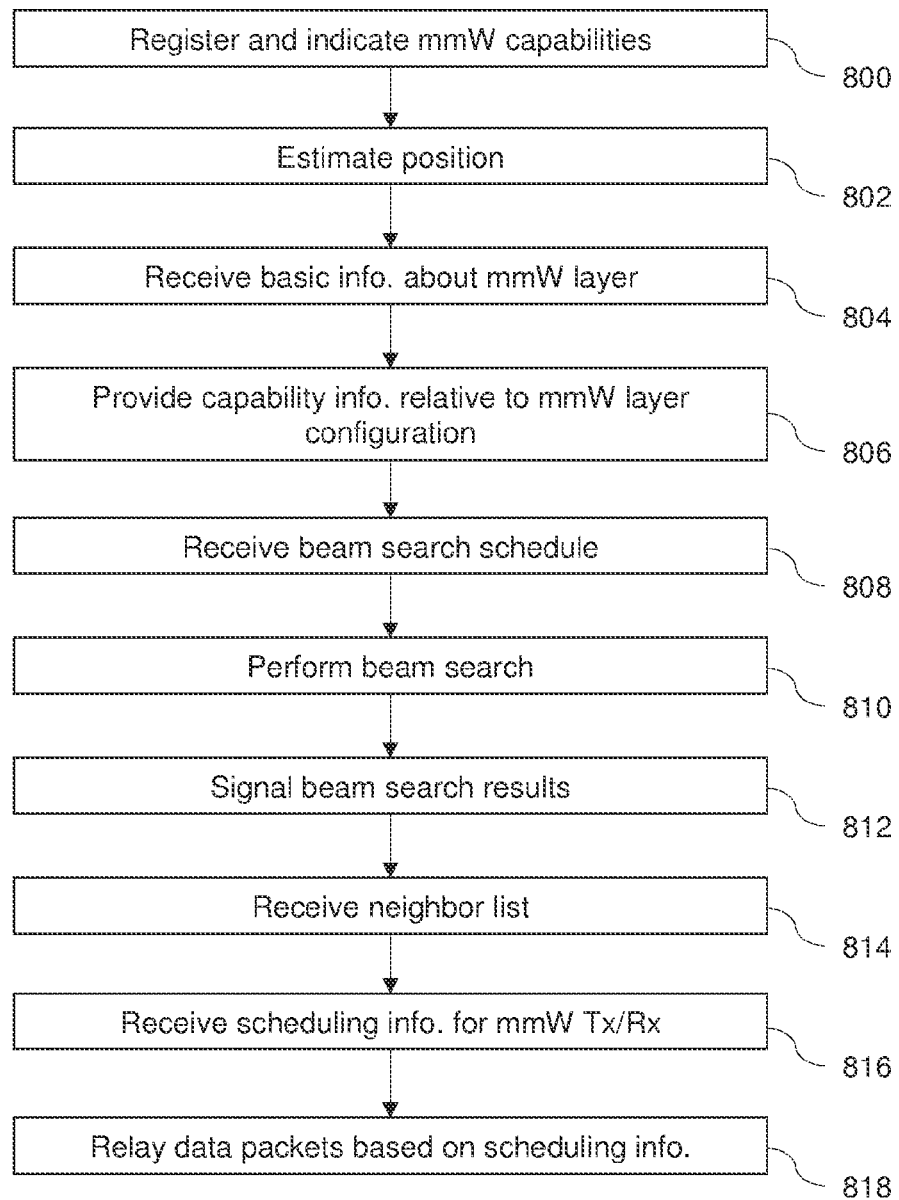
FIG. 8 shows a mmW base station initialization procedure.

The initialization process for a mB/BH candidate node is shown in FIG. 8. When a mB/BH candidate node turns on, it may first register as a UE and indicate that it has mmW BH capabilities (step 800). The candidate node and/or the network may estimate its position (step 802). A central node may provide basic information about the mmW layer, such as channel locations and BWs, a mmW/cellular TTI ratio, a cellular-mmW TTI offset at an estimated nearest neighbor, etc. (step 804). The candidate node may provide capability information relative to the mmW layer configuration (e.g., which of the channels listed may be supported, the number of beams that it can form in a beam search, and a number of antenna arrays) (step 806).

The central node may estimate the set of BH nodes that might be within range of the candidate node (a candidate neighbor list). The central node may provide a beam search schedule to BH nodes and the candidate node (808). The schedules may be provided by cellular RRC signaling. The schedule provided to the candidate node may contain mmW channels and TTIs in which to listen for other BH nodes, a Tx beam duration, and a beam sweep period (e.g., if the candidate neighbor nodes will sweep through their Tx beams in T seconds, then the candidate node should dwell on each of its Rx beams for T seconds). The schedule provided to the nodes in the candidate neighbor list may include mmW channels and TTIs in which to transmit beam sweeps, a Tx power, and beam sweep details (e.g., the number of beams to sweep through per mmW TTI, and the total number of beams to sweep through).

The candidate node may listen for transmissions according to the beam search schedule (step 810). After the beam search phase is completed (i.e., the search schedule expires), the candidate node may signal the central node via cellular RRC signaling (step 812). The candidate note may indicate the signal strength of each detected beam and the associated BH node IDs. Alternatively, a subset of these may be reported, e.g., the strongest beam from each BH node that was detected above some threshold, up to a maximum of K BH IDs.

The central node may select a subset of the indicated BH nodes as the neighbor list for the new node (i.e., these are now links to be added to the topology) and may signal the new node and the neighbors via cellular RRC signaling (step 814). The message may include a node ID at each end of the new links, and the currently preferred beam to use for each link (this may be for neighbors only).

After the new links are added, each link may go through an optional initial beam refinement phase to better align the beam directions. The new links may be added to sounding schedules (BH link sounding and end-to-end sounding). Once link metrics and end-to-end channel qualities are known by the central node, the new node may be scheduled via mmW control channels (step 816). An interference matrix may be used to help the central controller identify routes and possibly to de-rate MCS selections in the case of anticipated interference. Finally, the candidate node may relay data packets base on the scheduling via mmW control channels (step 818).

An edge mB node may have at least one mmW BH link to another mB, and a mmW access link to a mUE. The edge mB node may receive data packets, decode the packets, re-encode them, and re-transmit them. The reception and re-transmission of the data packets may use different MCSs and different numbers of TTIs per sub-frame. The following is an example in which twice as many access link TTIs as BH TTIs are used to deliver data that arrived on the BH links. mUEs 1,3,5,7 may be served by mB1, while mUEs 0,2,4,6, may be served by mB2.

The BH link to mB1 may use mmW TTIs 1, 3, 5, 7, to receive data intended for the UEs served by it (UEs 1,3,5,7). This is half of the mmW TTIs in the BH. The BH link to mB2 may use mmW TTIs 0, 2, 4, 6, to receive data intended for the UEs served by it (UEs 0,2,4,6). This is also half of the TTIs in the BH. mB1 may use access link mmW TTIs 2, 3 for UE1, TTIs 4, 5 for UE3, TTIs 6, 7 for UE5, and TTIs 0, 1 (of the next frame) for UE7. Thus, in the access link, all TTIs may be used. mB2 may use access link mmW TTIs 1, 2 for UE0, TTIs 3, 4 for UE2, TTIs 5, 6 for UE4, and TTIs 7, 0 (of the next frame) for UE6. Again, all access link TTIs may be used.

In this example, the BH resources are shared between the 2 mBs (with 50% of the duty cycle each) and each mB uses 100% of its access link resources to forward the data to its UEs. Thus, the code rate in the access link may be half of what it was in the BH.

As described above, channel quality indexing (CQI) may be part of the initialization of a new mB, and as detailed above, may also play a role in scheduling mmW BH links after initialization. The following paragraphs consider end-to-end sounding, and modulation and coding scheme (MCS) selection in mmW backhaul systems. Channel quality may be based on data transmissions or on sounding signals. In the AF technique, the training/pilot symbols transmitted by the source are amplified and forwarded in the same manner as the data, and therefore are a good reference for end-to-end channel quality estimation. In an end-to-end transmission (either UE to PoP or PoP to UE for the BH plus access link case, or mB to PoP or PoP to mB in the BH only case) the pilots are used for reception of the data, but may also be used for CQI estimation. A UE may be configured to send the mmW CQI corresponding to the last data reception(s) on the PUCCH (or optionally the PUSCH in the case that the PUSCH is used for UL) along with the ACK/NACKs of the mmW data. UE or mB transmissions to the PoP also contain training/pilots that are used for reception of packets and may be used for channel quality estimation. These end-to-end channel quality estimations may be used to compute the MCSs for UL grants.

Figure 9:
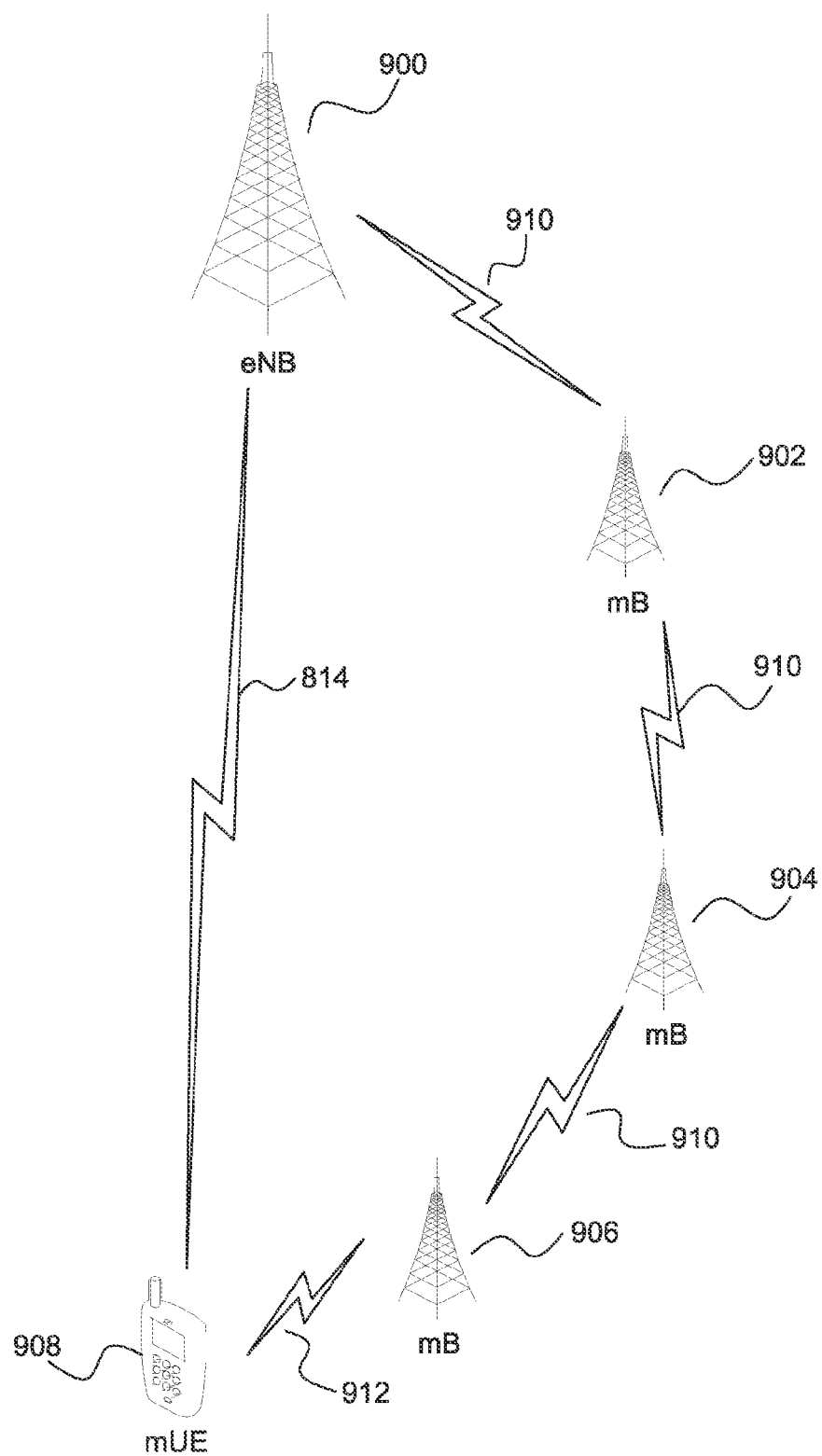
FIG. 9 illustrates end-to-end channel sounding over a scheduled route.

Training/pilot signals may also be scheduled explicitly for end-to-end channel quality estimation. FIG. 9 shows an example of an end-to-end channel sounding procedure over a scheduled route. An eNB 900 may send an AF transmission of a pilot to a last relay node 906 via multiple other mBs 902, 904. The pilot may be sent over mmW BH links 910. The pilot may then be transmitted to the mUE 908 over the mmW access link 912. The mUE 908 may use a cellular link 914 to send a sounding report that includes the pilot measurements to the eNB 900. Once the eNB 900 receives a sounding report, it may transmit an updated mmW relay schedule based on the report. The training/pilot signals may contain no user data (some control information may be included, e.g., when and how to report the corresponding CQI). The mmW sounding TTI may be shorter than the mmW data TTI, e.g., there may be multiple mmW sounding TTIs per mmW data TTI. The sounding (and CQI reporting when appropriate) may be scheduled with BH AF actions.

For semi-static mmW sounding/reporting, the mmW sounding TTIs may be scheduled as background tasks that are overridden by other higher priority tasks (e.g., data transmission). The semi-static mmW sounding may be scheduled via RRC messaging in the cellular layer. For DL channels, sounding may consist of a two-way exchange (a sounding signal followed by a CQI report). The CQI report may be sent on the same route as the sounding signal, but in the opposite direction. The CQI report may in turn be used to assess the end-to-end channel quality in the UL (i.e., a PoP node may learn about channel quality in the UL and DL). For UL only channel sounding, the channel quality estimate may not need to be reported back to the sounding signal transmitter. UL sounding may take less time since the response may not be needed. The extra time may be used for denser sounding or to carry other information. The UL sounding transmission may include additional control information like buffer status reports (BSRs).

For dynamic mmW sounding/reporting, a sounding message in the mmPDCCH/BHPDCCH may also be used to initiate sounding. The content of BH AF actions message for sounding may be similar as the message for data, and may include the following: a mB_ID; a direction of the receive beam (i.e., the ID of the node from which to receive a transmission); a channel of the mmW receive transmission; a direction of the transmit beam (i.e., the ID of the node to which to transmit); a mmW channel on which to transmit; a power with which to transmit; an indication of whether or not to add a training field to the transmission; a sub-TTI (if the sounding time period is smaller than the data time period, the sub-TTI may indicate in which part of a corresponding TTI to place the AF action); and an UL/DL indicator (DL may indicate that the AF mirror should be reversed to carry the CQI response to sounding).

The content of the mmPDCCH for sounding may include a UE_ID, a mB_ID, a Tx/Rx indicator, a transmit power (for sounding transmission), a mmW channel indicator, a sub-TTI, and a mmW CQI report.

Figure 10:
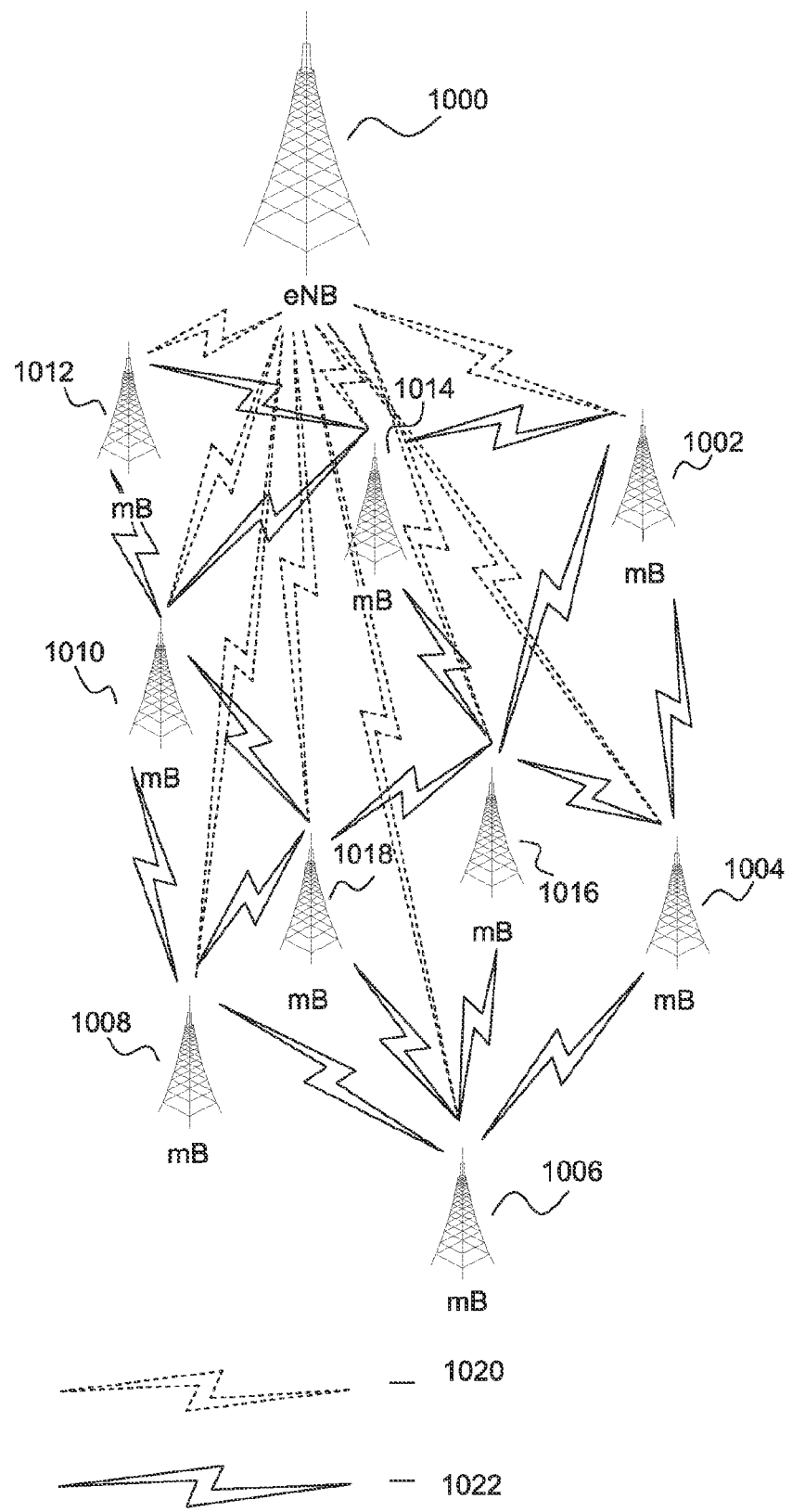
FIG. 10 illustrates sounding of individual backhaul links.

Backhaul link sounding may be used to measure the quality of mB-mB links, and while it may primarily be used for routing, it may aid in scheduling and MCS selections as well. FIG. 10 illustrates channel sounding of individual backhaul links of the mmW mesh network. The eNB 1000 may schedule the backhaul link sounding over the cellular links 1020. Pilots may then be transmitted between the mB's 1002-1018 via AF transmissions over BH links 1022. The mB's 1002-1018 may use the cellular links 1020 to report the pilot measurements to the eNB 1000. Once the eNB 1000 receives a report, it may transmit an updated mmW relay schedule based on the report.

Backhaul link sounding may be semi-statically scheduled along with end-to-end semi-static mmW sounding/reporting. The BH mmW sounding TTIs may be scheduled as background tasks that are overridden by other higher priority tasks (e.g., data transmission). Semi-static mmW sounding may be scheduled via RRC messaging in the cellular layer (this may either not conflict with end-to-end sounding or one process may be given priority over the other). A semi-static PUSCH grant on the cellular layer may be allocated to nodes to provide BH link quality metrics to PoP nodes. The PUSCH grant may be shared by multiple mBs, and the messages of multiple PUSCHs may be separated by CDMA/TDMA/FDMA within the PUSCH RBs.

Access link sounding may be used to measure the mmW access link quality at the mmW-capable UEs. For sounding between a serving mB and a mUE, the serving mB and its mUEs may exchange periodic control messages even when no messages to or from the PoP are carried. These messages may be used for the mobile access link maintenance. The central node (e.g., a PoP node) may provide an access link beam tracking schedule to each mB. The beam tracking schedule may indicate which mUEs in which mmW TTIs should be used to perform beam tracking updates and interference measurements. Channel quality may be assessed during the beam tracking update. The most recent channel quality assessments may be used for access link CQI reporting.

mBs may report access link CQIs to the PoP via the PUSCH. The access link CQI reporting may be scheduled via a persistent PUSCH schedule. A mB may also initiate an access link CQI report, for example, if a mUE requires a handover before the next scheduled CQI report. The report may be initiated by a normal service request (SR) on the cellular link, and may be piggybacked on other UL transmissions. An eNB that receives a report may transmit an updated mmW relay schedule based on the report.

Sounding between a neighbor mB and a mUE may be the same as between a serving mB and a mUE except that the motivation for initiating an aperiodic CQI report may be different. For example, the report may be used to indicate that a mUE with a low CQI should not be handed off to a particular mB, and the mB might be removed from the mUE's neighbor list.

As discussed earlier in connection with FIG. 2, the low latency mmW system may also act as a pure backhaul solution to carry multiple-access-user data to the edge mB in a similar way to fiber transmissions. Depending on the air interface of the access link between the edge mB and the end user, e.g. a UE or mUE, the edge node may perform decode-and-forward (DF). The eNB may schedule the multiple access link user data transmission together with the scheduling of the backhaul link in the mmDCI, and the scheduled users may take into account a pre-defined DF-related delay before starting to receive the de-multiplexed data. Alternatively, the eNB may only schedule the AF transmission to the edge mB and the edge mB may apply DF and also flow control, and may schedule the de-multiplexed data independently.

In the case of applying the low latency mmW system for a single user, the access link capacity may be substantially lower than the backhaul link capacity, and flow control and buffering may be applied after the DF process. In this scenario, the use of mmW TTIs in the access link and in the BH links may be decoupled.

To support DF in the edge mB, the mmPDCCH/BHPDCCH message to the edge mB may include additional information, or alternatively the edge mB may listen to the mmPDCCH of the served UEs. The information may include a BH MCS, an access link MCS, and a number of access link mmW TTIs per BH TTI. Note that only two of the three pieces of information (BH MCS, Access MC, Number of access link mmW TTIs per BH) may be needed. The information may also include a BH-access offset that indicates the time between the BH and access TTIs for a given packet.

In the embodiments described herein, it is also possible for the last hop to be on the cellular layer when the target UE does not have mmW capability. In this case, the mmW layer may provide a backhaul to the mBs, which may also act as small LTE cells. The edge mB may terminate the backhaul link and may Decode and Forward (DF) to translate the data from the mmW layer to the cellular layer. This may increase the latency, and thus may need to be taken into consideration for the system design. Both the envisioned AF/DF and AF-only versions of the mmW hot spot underlay systems may share a bulk of the system design described above. In the case in which the mmW layer is providing BH, the small cell may be a regular LTE eNB with its own scheduler, etc. Alternatively, where the mmW layer is providing backhaul to a small cell, the small cell may be a remote radio unit (with no local scheduler, etc.).

The apparatus shown in FIGS. 1A-1D may be configured to perform the functions described above. In particular, the WTRUs 102*a*-102*e*, mBs 172*a*-172*d*, and eNB 185 in FIG. 1D may be configured to perform the functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a base station for establishing a low latency millimeter wave (mmW) backhaul connection, the method comprising:
   receiving a mmW relay schedule from an evolved Node B (eNB) within one Long Term Evolution (LTE) scheduling interval;
   decoding the mmW relay schedule;
   steering a receive beam and a transmit beam according to the mmW relay schedule;
   receiving a data packet from a second base station in a mmW transmission time interval (TTI) based on the mmW relay schedule using the receive beam; and
   transmitting the data packet to a third base station based on the mmW relay schedule using the transmit beam, wherein the transmitting begins before reception of the data packet is complete.

2. The method of claim 1, wherein a length of the mmW TTI is based on a length and structure of the LTE scheduling interval.

3. The method of claim 1, wherein receiving the mmW relay schedule further comprises decoding downlink control information (DCI) in a Physical Downlink Control Channel (PDCCH) region of an LTE sub-frame.

4. The method of claim 3, wherein the mmW relay schedule is received in a mmW control channel, and wherein the DCI indicates at least one of a frequency allocation of the mmW control channel, a transport format of the mmW control channel, and at least one of a plurality of OFDM symbols in a Physical Downlink Shared Channel (PDSCH) region of the LTE sub-frame.

5. The method of claim 4, wherein the at least one of the plurality of OFDM symbols includes relay scheduling information for one mmW TTI and a frequency allocation for a mmW data channel, wherein the relay scheduling information includes at least one of a reception time, a receive antenna pattern, a frequency channel for reception, a transmission time, a transmit antenna pattern, a frequency channel for transmission and a transmit power.

6. The method of claim 1, further comprising:
   receiving, from the eNB, an eNB neighbor list that indicates a plurality of neighbor base stations of the eNB; and
   receiving, from the eNB, a plurality of base station neighbor lists that indicate a plurality of neighbor base stations of each of a plurality of base stations.

7. The method of claim 6, wherein the mmW relay schedule indicates a plurality of links, and wherein each link is identified by a transmitting base station and a receiving base station, wherein each of the transmitting base station and receiving base station is indicated by an index associated with one of the plurality of neighbor base stations on the eNB neighbor list or on one of the plurality of base station neighbor lists.

8. The method of claim 1, wherein the mmW relay schedule indicates a delay between receiving the mmW relay schedule and receiving the data packet.

9. The method of claim 1, further comprising:
   receiving a sounding schedule;
   performing a sounding procedure based on the sounding schedule; and
   transmitting a sounding report to an eNB via the LTE link.

10. The method of claim 9, further comprising:
    receiving an updated mmW relay schedule based on the sounding report.

11. A base station for establishing a low latency millimeter wave (mmW) backhaul connection, the base station comprising:
    a receiver configured to receive a mmW relay schedule from an evolved Node B (eNB) within one Long Term Evolution (LTE) scheduling interval;
    a processor configured to decode the mmW relay schedule;
    the processor configured to steer a receive beam and a transmit beam according to the mmW relay schedule;
    the receiver configured to receive a data packet from a second base station in a mmW transmission time interval (TTI) based on the mmW relay schedule using the receive beam; and
    a transmitter configured to transmit the data packet to a third base station based on the mmW relay schedule using the transmit beam, wherein the transmitting begins before reception of the data packet is complete.

12. The base station of claim 11, wherein a length of the mmW TTI is based on a length and structure of the LTE scheduling interval.

13. The base station of claim 11, wherein receiving the mmW relay schedule further comprises decoding downlink control information (DCI) in a Physical Downlink Control Channel (PDCCH) region of an LTE sub-frame.

14. The base station of claim 13, wherein the mmW relay schedule is received in a mmW control channel, and wherein the DCI indicates at least one of a frequency allocation of the mmW control channel, a transport format of the mmW control channel, and at least one of a plurality of OFDM symbols in a Physical Downlink Shared Channel (PDSCH) region of the LTE sub-frame.

15. The base station of claim 14, wherein the at least one of the plurality of OFDM symbols includes relay scheduling information for one mmW TTI and a frequency allocation for a mmW data channel, wherein the relay scheduling information includes at least one of a reception time, a receive antenna pattern, a frequency channel for reception, a transmission time, a transmit antenna pattern, a frequency channel for transmission, and a transmit power.

16. The base station of claim 11, wherein:
the receiver is further configured to receive, from the eNB, an eNB neighbor list that indicates a plurality of neighbor base stations of the eNB; and
the receiver is further configured to receive, from the eNB, a plurality of base station neighbor lists that indicate a plurality of neighbor base stations of each of a plurality of base stations.

17. The base station of claim 16, wherein the mmW relay schedule indicates a plurality of links, wherein each link is identified by a transmitting base station and a receiving base station, and wherein each of the transmitting base station and receiving base station is indicated by an index associated with one of the plurality of neighbor base stations on the eNB neighbor list or on one of the plurality of base station neighbor lists.

18. The base station of claim 11, wherein the mmW relay schedule indicates a delay between receiving the mmW relay schedule and receiving the data packet.

19. The base station of claim 11, wherein:
the receiver is further configured to receive a sounding schedule; the processor is further configured to perform a sounding procedure based on the sounding schedule; and the transmitter is further configured to transmit a sounding report to an eNB via the LTE link.

20. The base station of claim 19, wherein:
the receiver is further configured to receive an updated mmW relay schedule based on the sounding report.

* * * * *